United States Patent
Venkatakrishnan et al.

(10) Patent No.: US 12,327,077 B2
(45) Date of Patent: Jun. 10, 2025

(54) DEADLOCK DETECTION AND PREVENTION FOR ROUTING PACKET-SWITCHED NETS IN ELECTRONIC SYSTEMS

(71) Applicant: Xilinx, Inc., San Jose, CA (US)

(72) Inventors: Sreesan Venkatakrishnan, San Jose, CA (US); Nitin Deshmukh, Monroe, WA (US); Satish B. Sivaswamy, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 545 days.

(21) Appl. No.: 17/662,037

(22) Filed: May 4, 2022

(65) Prior Publication Data

US 2023/0359801 A1 Nov. 9, 2023

(51) Int. Cl.
*G06F 30/394* (2020.01)
*G06F 30/398* (2020.01)
*G06F 111/04* (2020.01)

(52) U.S. Cl.
CPC .......... *G06F 30/394* (2020.01); *G06F 30/398* (2020.01); *G06F 2111/04* (2020.01)

(58) Field of Classification Search
CPC ... G06F 30/394; G06F 30/398; G06F 2111/04
See application file for complete search history.

(56) References Cited

U.S. PATENT DOCUMENTS

| | | | |
|---|---|---|---|
| 7,970,977 B1 | 6/2011 | Li et al. | |
| 8,154,989 B1 | 4/2012 | Susai et al. | |
| 8,312,409 B1* | 11/2012 | Jain | G06F 30/394 |
| | | | 716/124 |
| 8,522,185 B1* | 8/2013 | Balzli, Jr. | G06F 30/394 |
| | | | 716/129 |
| 9,009,648 B2* | 4/2015 | Kumar | H04L 45/18 |
| | | | 716/138 |
| 9,244,880 B2* | 1/2016 | Philip | G06F 15/17312 |
| 9,906,435 B2* | 2/2018 | Fu | H04L 45/22 |
| 10,050,843 B2* | 8/2018 | Raponi | G06F 30/00 |
| 10,565,346 B1 | 2/2020 | Suthar et al. | |
| 10,628,547 B1 | 4/2020 | Swarbrick et al. | |
| 11,176,302 B2* | 11/2021 | Rao | G06F 30/392 |
| 11,580,284 B1* | 2/2023 | Deaton | G06F 30/3323 |
| 12,204,794 B1* | 1/2025 | Ziai | G06F 3/0673 |

(Continued)

*Primary Examiner* — Nha T Nguyen

(74) *Attorney, Agent, or Firm* — Kevin T. Cuenot

(57) ABSTRACT

Routing a circuit design includes generating a graph of the circuit design where each connected component is represented as a vertex, generating a routing solution for the circuit design by routing packet-switched nets so that the packet-switched nets of a same connected component do not overlap, and, for each routing resource that is shared by packet-switched nets of different connected components, indicating the shared routing resource on the graph by adding an edge. Cycle detection may be performed on the graph. For each cycle detected on the graph, the cycle may be broken by deleting the edge from the graph and ripping-up a portion of the routing solution corresponding to the deleted edge. The circuit design, or portion thereof, for which the routing solution was ripped up may be re-routed using an increased cost for a shared routing resource freed from the ripping-up.

20 Claims, 11 Drawing Sheets

(56) References Cited

U.S. PATENT DOCUMENTS

| | | | | |
|---|---|---|---|---|
| 2014/0068132 A1* | 3/2014 | Philip | ............... | G06F 15/17312 |
| | | | | 710/306 |
| 2014/0204735 A1* | 7/2014 | Kumar | ................... | H04L 47/12 |
| | | | | 370/229 |
| 2015/0016257 A1* | 1/2015 | Kumar | ................... | H04L 47/16 |
| | | | | 370/235 |
| 2021/0320869 A1* | 10/2021 | Bourai | ................. | H04L 47/125 |
| 2023/0327976 A1* | 10/2023 | de Souza | ................ | H04L 45/02 |
| | | | | 370/351 |

\* cited by examiner

DEADLOCK DETECTION AND PREVENTION FOR ROUTING PACKET-SWITCHED NETS IN ELECTRONIC SYSTEMS

TECHNICAL FIELD

This disclosure relates to integrated circuits (ICs) and, more particularly, to routing packet-switched nets of a circuit design for implementation in an IC.

BACKGROUND

A variety of different types of integrated circuits (ICs) incorporate electronic systems that utilize a network of switches to convey data. Data is conveyed among the nodes of the electronic system or systems using the switches as packet-switched nets. One example of an electronic system of an IC that uses packet-switched nets is a data processing array that includes tens or hundreds of compute tiles, or circuits, each having a switch. The switches are interconnected. The compute circuits communicate via packet-switched nets conveyed by the respective switches of the compute circuits. Another example of an electronic system in an IC that uses packet-switched nets is a programmable Network-on-Chip (NoC) having a plurality of switches.

In the foregoing examples, the routing switches may be configured and/or reconfigured based on the particular application to be implemented in the IC. Unlike general networking environments such as Local Area Networks, the Internet, and the like, where computer systems are communicatively linked, in the case of an IC, the particular application implemented in the IC or system(s) thereof defines the connectivity that is required. In the case of an IC, unlike the general computer networking case, the available resources for routing packet-switched nets are limited and may not be expanded. These limitations necessitate the sharing of physical resources (e.g., switches) within the IC that may cause deadlock conditions to arise.

SUMMARY

In one or more example implementations, a method includes generating a graph of a circuit design in which each connected component of the circuit design is represented as a vertex. The method includes generating a routing solution for the circuit design by routing packet-switched nets of the circuit design so that the packet-switched nets of a same connected component do not overlap. The method includes, for each routing resource that is shared by packet-switched nets of different connected components, indicating the shared routing resource on the graph by adding an edge. The method includes performing cycle detection on the graph. The method includes, for each cycle detected on the graph, breaking the cycle by deleting the edge from the graph and ripping-up at least a portion of the routing solution corresponding to the deleted edge. The method includes re-routing at least a portion of the circuit design for which at least a portion of the routing solution was ripped up using an increased cost for a shared routing resource freed from the ripping-up.

In one or more example implementations, a system includes a processor configured to initiate operations. The operations include generating a graph of a circuit design in which each connected component of the circuit design is represented as a vertex. The operations include generating a routing solution for the circuit design by routing packet-switched nets of the circuit design so that the packet-switched nets of a same connected component do not overlap. The operations include, for each routing resource that is shared by packet-switched nets of different connected components, indicating the shared routing resource on the graph by adding an edge. The operations include performing cycle detection on the graph. The operations include, for each cycle detected on the graph, breaking the cycle by deleting the edge from the graph and ripping-up at least a portion of the routing solution corresponding to the deleted edge. The operations include re-routing at least a portion of the circuit design for which at least a portion of the routing solution was ripped up using an increased cost for a shared routing resource freed from the ripping-up.

In one or more example implementations, a computer program product includes one or more computer-readable storage media, and program instructions collectively stored on the one or more computer-readable storage media. The program instructions are executable by computer hardware to initiate operations. The operations include generating a graph of a circuit design in which each connected component of the circuit design is represented as a vertex. The operations include generating a routing solution for the circuit design by routing packet-switched nets of the circuit design so that the packet-switched nets of a same connected component do not overlap. The operations include, for each routing resource that is shared by packet-switched nets of different connected components, indicating the shared routing resource on the graph by adding an edge. The operations include performing cycle detection on the graph. The operations include, for each cycle detected on the graph, breaking the cycle by deleting the edge from the graph and ripping-up at least a portion of the routing solution corresponding to the deleted edge. The operations include re-routing at least a portion of the circuit design for which at least a portion of the routing solution was ripped up using an increased cost for a shared routing resource freed from the ripping-up.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
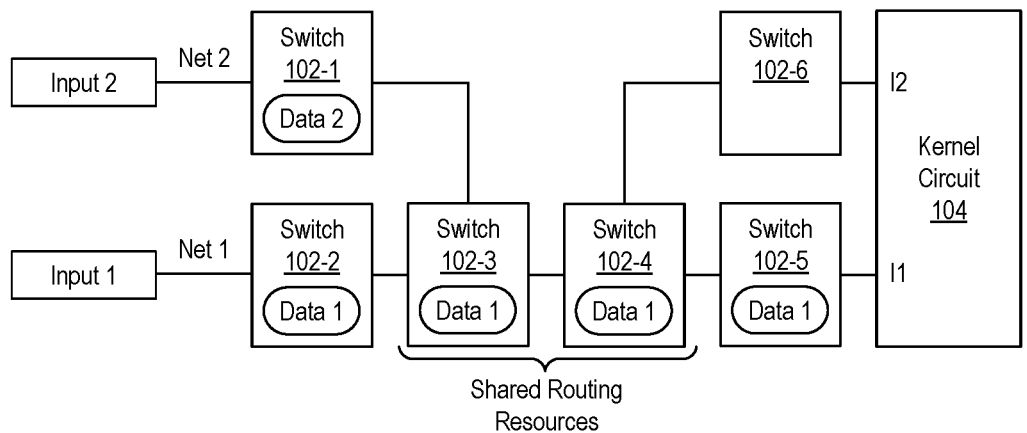
FIG. 1 illustrates an example of a deadlock condition arising in a circuit architecture that is capable of conveying data as packet-switched nets.

This disclosure relates to integrated circuits (ICs) and, more particularly, to routing packet-switched nets of a circuit design for implementation in an IC. In accordance with the inventive arrangements described within this disclosure, a circuit design for an IC may include packet-switched nets. The packet-switched nets convey packetized data. Like non-packet-switched nets of a circuit design, packet-switched nets are mapped to physical routing resources of an IC via a process generally referred to as routing. While non-packet-switched nets may be mapped to wires, packet-switched nets of a circuit design may be mapped to a plurality of interconnected switches capable of conveying packetized data.

Conventional routing operations performed with respect to non-packet-switched nets avoid overlap conditions. As defined within this disclosure, the term "overlap condition" or "overlap," in reference to a routing solution for a circuit design, means that two or more nets of the circuit design share, e.g., are mapped to, a same routing resource of the IC. Thus, two or more nets (e.g., non-packet-switched nets) may not be mapped to a same wire, for example.

By comparison, packet-switched nets of a circuit design are permitted to overlap in certain situations. In accordance with the inventive arrangements described within this disclosure, packet-switched nets may overlap so long as the routing solution that is realized does not introduce or create any new cycles within the routed circuit design. Any cycles created as a consequence of routing packet-switched nets are unintended and may result in deadlock conditions that prevent the circuit design, as physically implemented within the IC, from functioning properly. It should be appreciated that any cycles that existed in the circuit design prior to the routing described herein (e.g., cycles not introduced by the routing process described herein) may be presumed by the inventive arrangements to have been intentionally created (e.g., by a user) and left unchanged.

The inventive arrangements described herein provide methods, systems, and computer-program products that are capable of routing packet-switched nets of a circuit design. The routing that is performed avoids the creation of new cycles within the routed circuit design that may cause deadlock conditions to arise. The phrase "new cycles" refers to cycles that did not exist in the circuit design prior to the routing described herein (e.g., with reference to FIGS. 3 and 7) and that were created as a consequence of the routing described herein. The techniques described herein may be applied to routing various packet-switched nets of circuit designs intended for implementation in any of a variety of different systems incorporated into an IC. For purposes of illustration and not limitation, the routing techniques described herein may be used to route packet-switched nets for a Network-on-Chip (NoC) including a programmable NoC and for a data processing array having a plurality of compute and/or memory tiles coupled by switches. Examples of different types of IC and/or circuit architectures that utilize packet-switched nets with which the inventive arrangements may be used are illustrated within this disclosure in connection with FIGS. 9, 10, 11, and 12. Further aspects of the inventive arrangements are described below with reference to the figures.

FIG. 1 illustrates an example of a deadlock condition arising in a circuit architecture that is capable of conveying packet-switched nets. The circuit architecture of FIG. 1 is disposed in an IC. The circuit architecture includes a plurality of switches 102 (e.g., 102-1, 102-2, 102-3, 102-4, 102-5, and 102-6) and a kernel circuit 104. In the example, inputs 1 and 2 are data producing circuits, while kernel circuit 104 is a data consuming circuit. The switches 102 are interconnected. It should be appreciated that the circuit architecture may include additional switches that are not used by the packet-switched nets illustrated in FIG. 1 and, as such, are not shown.

In one example implementation, the switches 102 may be implemented as routing circuits or switches. In another example implementation, the switches 102 may be implemented as stream switches or other types of on-chip interconnects. An example of a stream switch is an Advanced Microcontroller Bus Architecture (AMBA) eXtensible Interface (AXI) (hereafter "AXI") protocol and communication compliant circuit capable of conveying stream data. The data streams may be conveyed from switch-to-switch over packet-switched, point-to-point stream connections. AXI is provided as an illustrative example of a switch and is not intended as a limitation of the examples described within this disclosure. It should be appreciated that switches compliant with other similar and/or equivalent protocols may be used.

In the example, the switches 102 may be programmed to establish logical connections between input 1 and an input port I1 of kernel circuit 104 and between input 2 and input port I2 of kernel circuit 104. For purposes of illustration, same numbering is used to refer to inputs, input ports, nets, and data. That is, for example, "Data 1" represents packetized data of net 1 and is conveyed from input 1 to input port I1. Nets 1 and 2 are packet-switched nets. Net 1 is routed from input 1 to input port I1 of kernel circuit 104 through switches 102-2, 102-3, 102-4, and 102-5. Net 2 is routed from input 2 to input port I2 of kernel circuit 104 through switches 102-1, 102-3, 102-4, and 102-6. As can be observed, net 1 and net 2 share routing resources, e.g., switches 102-3 and 102-4. In the example, kernel circuit 104 requires data on both input ports I1 and I2 to perform a compute operation.

In the example, packets produced by input 1 are shown as "Data 1," while packets produced by input 2 are shown as "Data 2." In the example architecture of FIG. 1, for purposes of illustration, it can be assumed that the kernel circuit 104 requires one packet of Data 1 and one packet of Data 2 as received by each of input ports I1 and I2 to perform one instruction (e.g., compute operation). Until both packets are received by the kernel circuit 104, the kernel circuit 104 will stall. For example, if input port I1 has a packet ready, but input port I2 has not received a packet, then kernel circuit 104 stalls and creates backpressure on net1. In this case, because switches 102-2, 102-3, 102-4, and 102-5 are filled with packets of Data 1, packets of Data 2 in switch 102-1 may not progress to input port I2 of kernel circuit 104.

Typically, input 1 and input 2 may produce packets at different times and/or at different rates. In a scenario where input 1 produces packets of Data 1 faster than input 2, the packets of Data 1 arrive at input port I1 prior to the packets of Data 2 reaching input port I2, thereby creating backpressure on net1 since the kernel circuit 104 may consume the packet of Data 1 in input port I1 only if the packet of Data 2 from input port I2 is also available. In this example, the path from input 1 to input port I1 fills up completely, including the shared routing resources (switches 102-3, 102-4). Eventually, when packets of Data 2 are produced by input 2, the packets cannot pass through the shared routing resources.

The kernel circuit 104 cannot proceed with the compute operation since only data from input port I1 is available. This means that the kernel circuit 104 will not consume the data that is available at input port I1 leaving the shared resources (switches 102-3 and 102-4) full so that Data 2 from input 2 will not be able to reach input port I2. The inventive arrangements described herein avoid a routing solution with the potential of a deadlock condition as illustrated in the example of FIG. 1.

Figure 2:
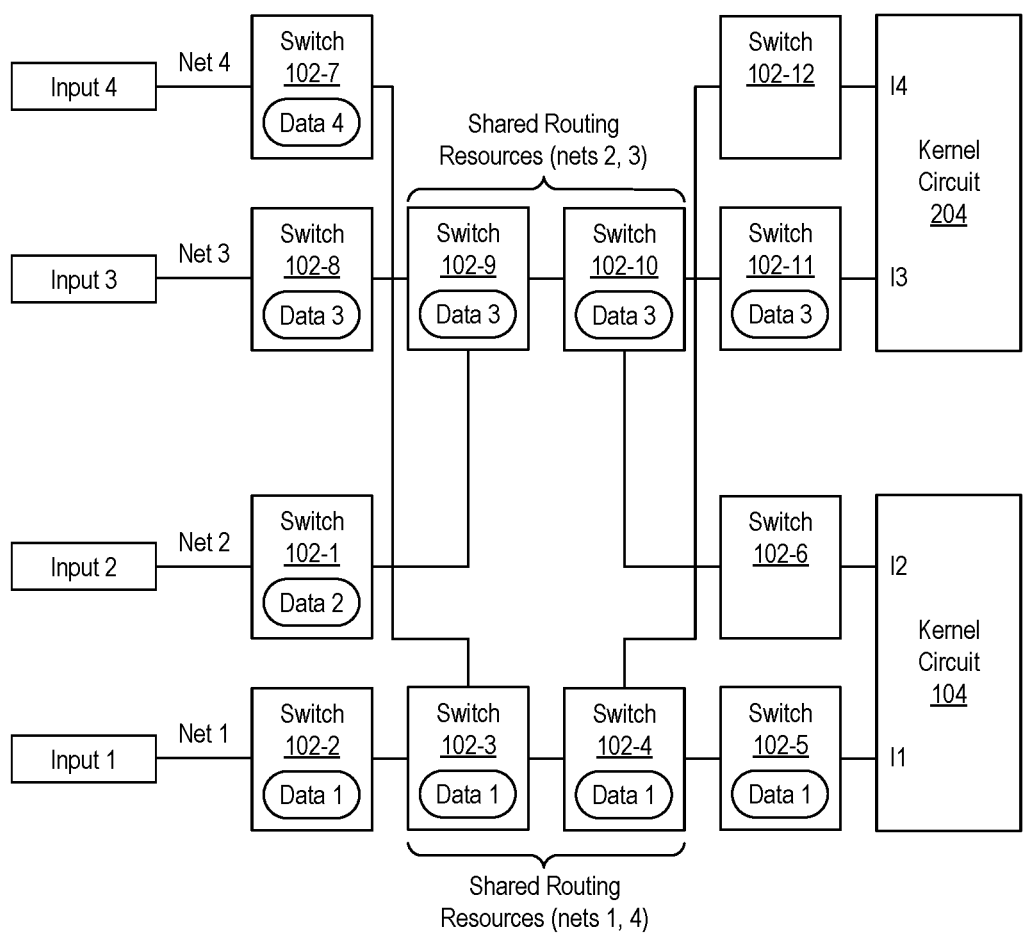
FIG. 2 illustrates another example of a deadlock condition arising in a circuit architecture that is capable of conveying data as packet-switched nets.

FIG. 2 illustrates another example of a deadlock condition arising in a circuit architecture that is capable of conveying packet-switched nets. The circuit architecture of FIG. 2 is disposed in an IC. Structurally speaking, the circuit architecture is similar to that of FIG. 1, but includes an additional kernel circuit 204 having input ports I3 and I4, additional inputs 3 and 4, and additional switches 102-7, 102-8, 102-9, 102-10, 102-11, and 102-12. Nets 1, 2, 3, and 4 are packet-switched nets. Inputs 1, 2, 3, and 4 are data producers, while kernel circuits 104, 204 are data consumers.

In terms of routing, net 1 is routed from input 1 to input port I1 of kernel circuit 104 through switches 102-2, 102-3, 102-4, and 102-5. Net 2 is routed from input 2 to input port I2 of kernel circuit 104 through switches 102-1, 102-9, 102-10, and 102-6. Net 3 is routed from input 3 to input port I3 of kernel circuit 204 through switches 102-8, 102-9, 102-10, and 102-11. Net 4 is routed from input 4 to input port I4 of kernel circuit 204 through switches 102-7, 102-3, 102-4, and 102-12. In the example, switches 102-9 and 102-10 are shared routing resources that are utilized by both nets 2 and 3. Similarly, switches 102-3 and 102-4 are shared routing resources that are utilized by both nets 1 and 4.

For purposes of illustration, consider the case where each of kernel circuits 104 and 204 performs a multiplication operation (e.g., a matrix multiply operation). For example, kernel circuit 104 performs an operation such as mulA= (input 1)*(input 2), while kernel circuit 204 performs an operation such as mulB=(input 3)*(input 4). Thus, both kernel circuits 104 and 204 must consume some data from both of their respective input ports to perform a compute instruction. If data on any of the input ports to either kernel circuit 104 and/or kernel circuit 204 does not arrive, that kernel circuit will wait, which may cause backpressure in the input stream in which the data has arrived. The kernel circuit cannot consume the subsequent packets in this stream while waiting for data in the other input stream.

In the example of FIG. 2, consider the case where net 3 fully occupies the shared routing resources (e.g., switches 102-9 and 102-10) due to the packets of Data 3 being produced by input 3 and arriving prior to packets of Data 2. In addition, net 1 fully occupies the shared routing resources (e.g., switches 102-3 and 102-4) with packets of Data 1 produced by input 1 that have arrived earlier than packets of Data 4 produced by input 4. In this case, when input 2 starts producing packets of Data 2, input 2 must wait for kernel circuit 204 to start consuming packets of Data 3 since backpressure has built up through switches 102-9 and 102-10.

When input 4 starts producing packets of Data 4, input 4 must wait until kernel circuit 104 starts consuming packets of Data 1 since backpressure has built up through switches 102-3 and 102-4. Kernel circuit 104 will consume only 1 packet of Data 1 from input port I1 and wait to perform its instructions until a packet of Data 2 arrives at input port I2. Kernel circuit 204 will consume only 1 packet of Data 3 from input port I3 and wait to perform its instructions until a packet of Data 4 arrives at input port I4. As illustrated, however, packets of Data 2 cannot reach kernel circuit 104 until kernel circuit 204 consumes more packets of Data 3. Similarly, packets of Data 4 cannot reach kernel circuit 204 until kernel circuit 104 consumes more packets of Data 1. Thus, both of kernel circuits 104, 204 are waiting for the other leading to a deadlock condition. The inventive arrangements described herein avoid a routing solution with the potential of a deadlock condition as illustrated in the example of FIG. 2.

The inventive arrangements are capable of resolving other patterns of resource sharing that are extensions of those illustrated in the examples of FIGS. 1 and 2.

While some solutions have been proposed for deadlock-free routing in the context of network computing, a computing networking environment differs from that implemented on an IC. For example, in computing network architectures, as compared to network architectures implemented in ICs or other devices, the configuration of a network router may be changed dynamically at runtime based on factors such as network traffic. Further, there are significantly more options for routing packets of data and new routers may be added. By comparison, in the case of network architectures implemented within an IC, additional routing resources are not available and may not be added. Further, in the IC case, the configuration of the switches is static with respect to data access patterns and timing. Changing the configuration of a switch often requires that the IC, or a portion thereof, be deactivated for the reconfiguration operation to take place thereby making the IC or the portion being reconfigured unavailable for use during that time. For these reasons, deadlock conditions are to be avoided in any switch configuration that is generated for the IC.

Figure 3:
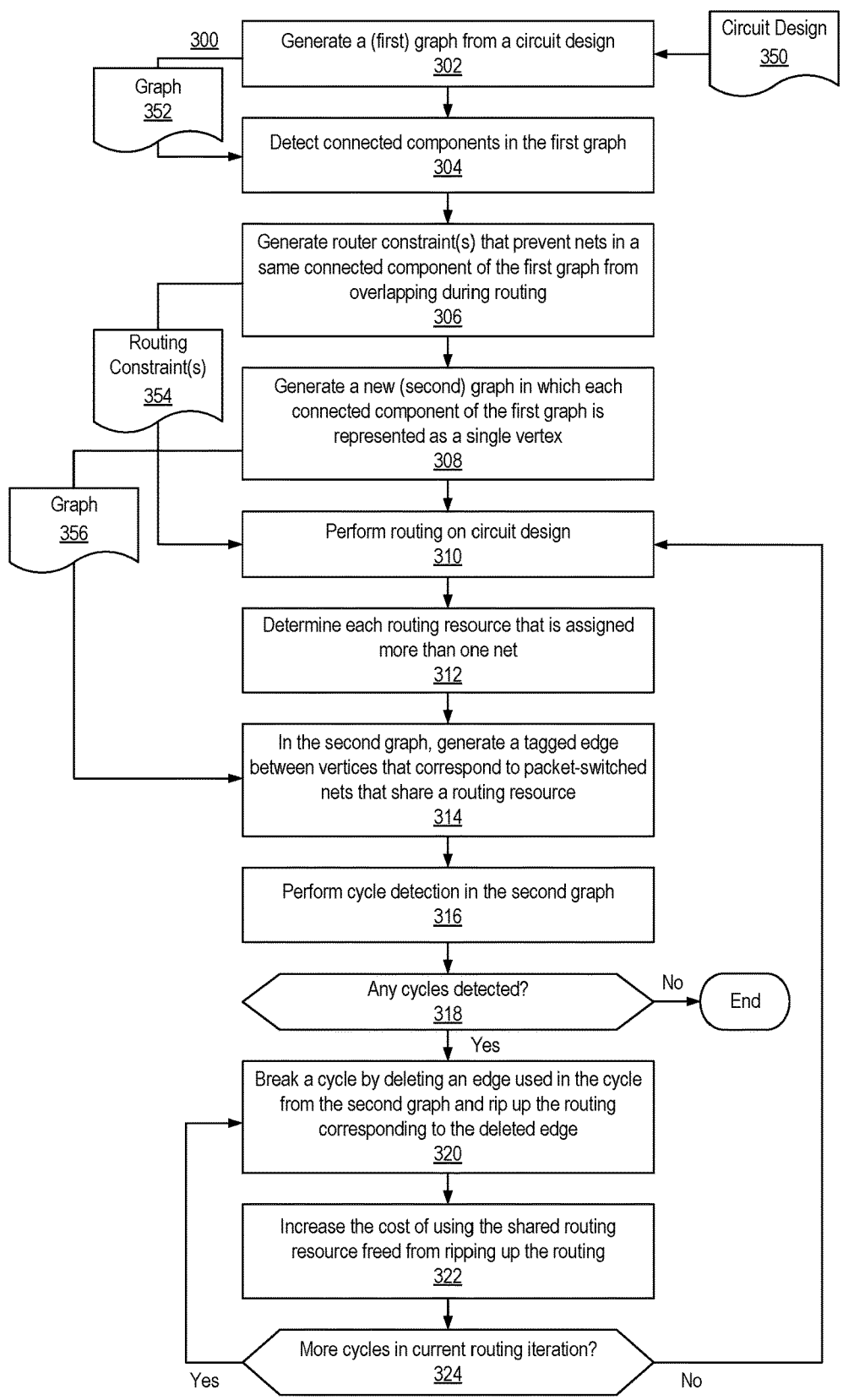
FIG. 3 illustrates an example method of routing a circuit design that includes packet-switched nets.

FIG. 3 illustrates an example method 300 of routing a circuit design that includes packet-switched nets. Method 300 may be performed by a data processing system (e.g., the "system") executing suitable operational program code (e.g., software). An example of a data processing system that may be programmed to perform the operations illustrated in FIG. 3 is described in connection with FIG. 13. The system, for example, may include Electronic Design Automation (EDA) program code or software that, upon execution, is capable of performing the operations described herein and/or the different phases of a design flow. For example, the EDA program code may be executed to perform synthesis, placement, and/or routing. The program code that is executable to perform routing is generally referred to as a router.

In block 302, the system generates an initial, or first, graph 352 from a circuit design 350. In one aspect, the circuit design is specified as a logical netlist. The graph 352 may be specified as an undirected graph. In one aspect, the system generates graph 352 with each packet-switched net of the circuit design 350 being represented as a vertex.

Figure 4:
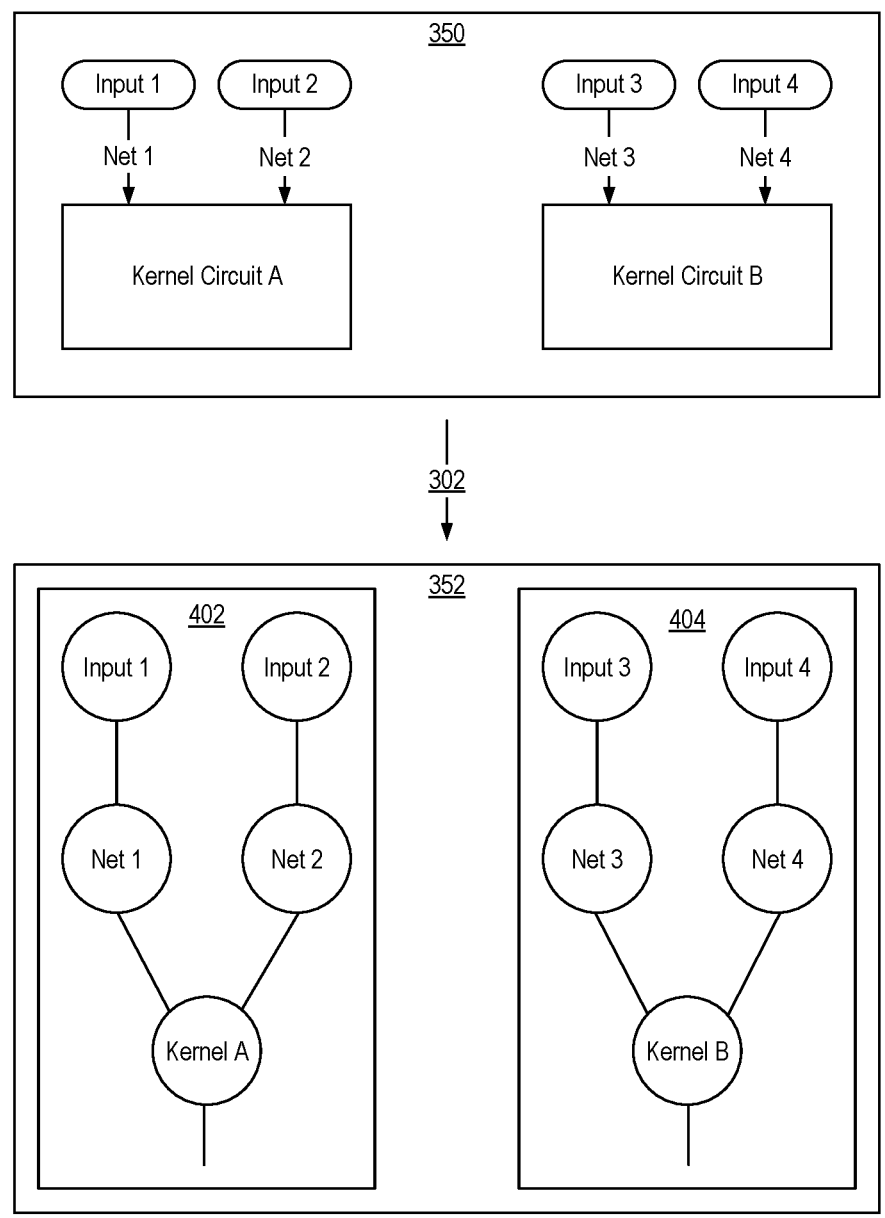
FIG. 4 illustrates an example of the operation performed by the system in block 302 of FIG. 3.

FIG. 4 illustrates the operation performed by the system in block 302 of FIG. 3. In the example, circuit design 350 includes two kernel circuits shown as kernel circuits A and B. Kernel circuit A is coupled to an input 1 via a net 1 and is coupled to an input 2 via a net 2. Kernel circuit B is coupled to an input 3 via a net 3 and is coupled to an input 4 via a net 4. Each of nets 1, 2, 3, and 4 is a packet-switched net. The system generates graph 352 from circuit design 350. As shown, rather than representing each of nets 1, 2, 3, and 4 as an edge within graph 352 as is done conventionally, each of nets 1, 2, 3, and 4 is represented in graph 352 as a vertex.

In block 304, the system detects the connected components in graph 352. Referring again to FIG. 4, the system has detected connected components 402 and 404 within graph 352. A connected component is a subgraph in which each pair of nodes is connected with each other via an edge.

In block 306, the system generates one or more routing constraints 354 that are used in routing the packet-switched nets of circuit design 350. In one aspect, routing constraint(s) 354 specify that the packet-switched nets of a same connected component do not overlap. That is, while routing the packet-switched nets of circuit design 350, the router follows routing constraints 354 and ensures that the packet-switched nets of each connected component identified in graph 352 do not share the same routing resources.

Referring again to the example of FIG. 4, routing constraints 354 prohibit the router from assigning the same routing resource, e.g., switch, to net 1 and to net 2. Similarly, routing constraints 354 prohibit the router from assigning the same routing resource to net 3 and to net 4. It should be appreciated that the router is permitted to allow nets of different connected components to share a same routing resource. Thus, for example, net 1 may share a routing resource with net 3 or net 4. Similarly, net 2 may share a routing resource with net 3 or net 4.

Figure 5:
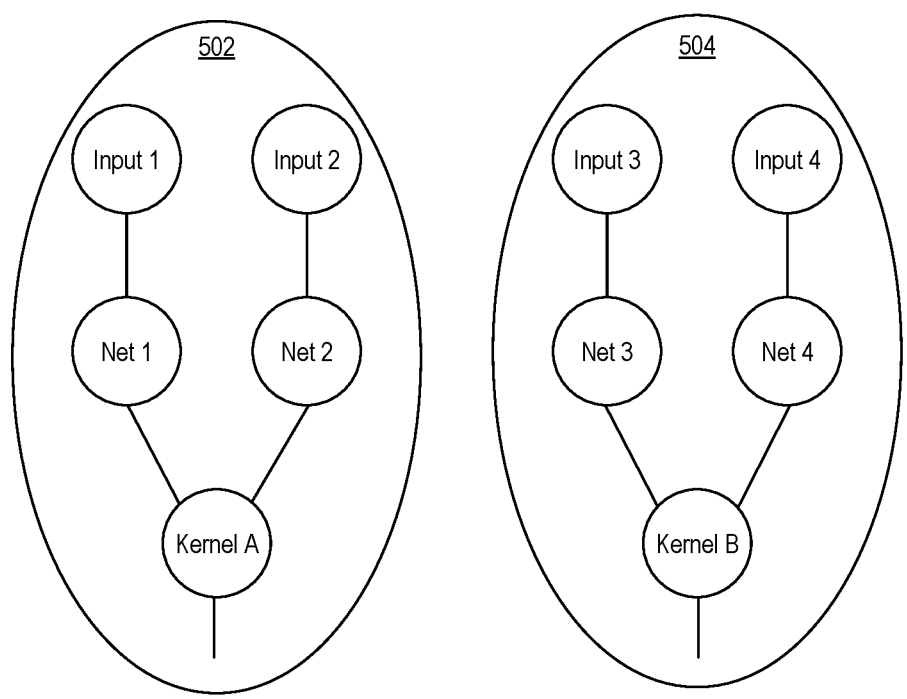
FIG. 5 illustrates an example of a graph generated by the system.

In block 308, the system generates a graph 356 in which each connected component identified in graph 352 is represented as a single vertex. FIG. 5 illustrates an example of graph 356. In the example of FIG. 5, the system has generated graph 356 based on the example of graph 352 of FIG. 4. Graph 356 includes a vertex 502 representing connected component 402 and a vertex 504 representing connected component 404. For purposes of illustration, the original nodes of graph 352 are shown. It should be appreciated that the nodes need not be included in the vertexes 502, 504. The system may generate a further data structure mapping each of vertexes 502, 504 to connected components 402, 404, respectively, and their constituent nodes and/or edges from graph 352.

In block 310, the system performs routing on circuit design 350. The routing performed by the system in block 310 generates a routing solution. In general, the routing solution specifies a mapping of packet-switched nets to routing resources, e.g., switches, of the particular IC in which circuit design 350 is to be implemented (e.g., the target IC). As noted, in generating the routing solution, the system permits overlap of packet-switched nets belonging to different connected components.

In block 312, the system determines each routing resource that is assigned to more than one net. More particularly the system determines each switch that is assigned to more than one packet-switched net. As previously discussed, while the router does not allow packet-switched nets of a same connected component to use or share a same routing resource, packet-switched nets from different connected components may share a same routing resource. Accordingly, the system detects each routing resource that is so shared by more than one packet-switched net.

In block 314, the system generates an edge between vertices in the graph 356 for each pair of nets that share a routing resource. By virtue of operation of the router based on routing constraints 354, only packet-switched nets of different connected components may share a routing resource. Thus, the edge(s) created in block 314 will only be among vertices in graph 356. The system further is capable of tagging, or annotating, each edge that is created in graph 356 with information specifying the nets and/or components involved.

Figure 6:
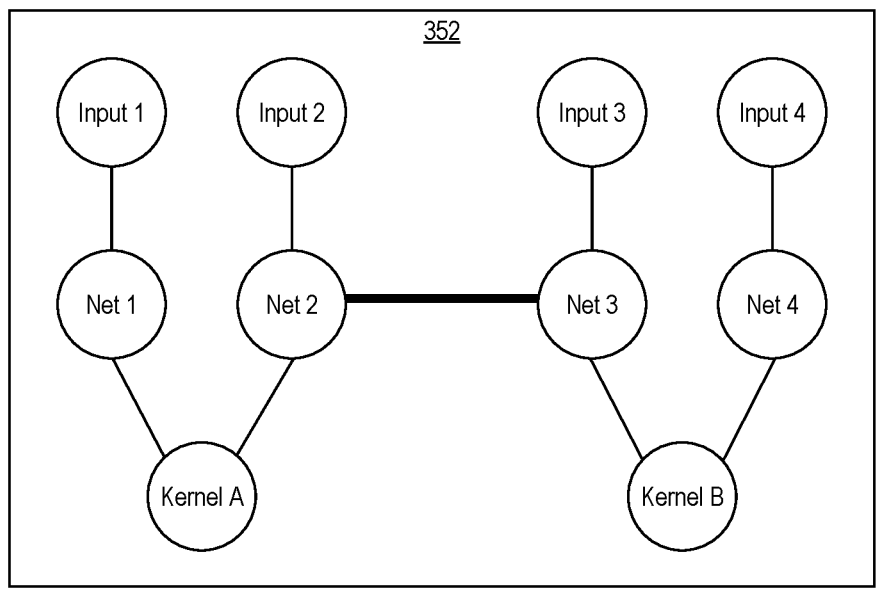
FIG. 6 illustrates an example of the edge creation described in FIG. 3.
Figure 6:
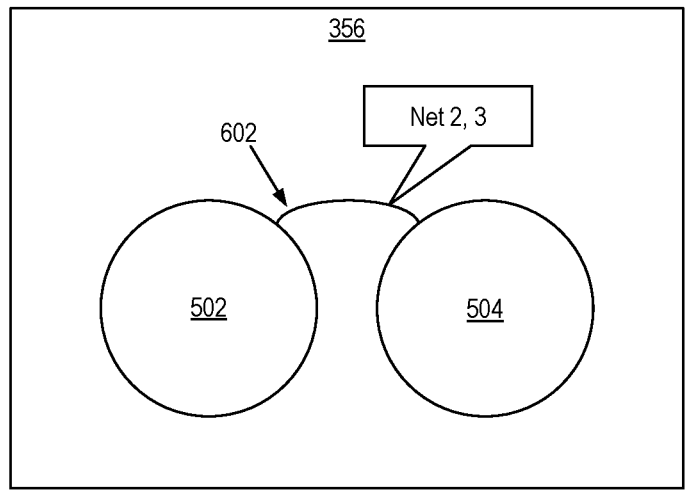

FIG. 6 illustrates an example of the edge creation described in block 314. In the example of FIG. 6, graph 352 is shown with an edge connecting nets 2 and 3 only to illustrate that the routing solution generated in block 310 specifies that nets 2 and 3 share one or more routing resources. In the example, the system has created edge 602 connecting vertices 502, 504 in graph 356. Further, the system has annotated edge 602 with the particular packet-switched nets that share the one or more routing resources. In another example, the particular routing resource(s) that are shared by nets 2 and 3 may be included in the annotation for edge 602. In the example, the system creates edge 602 connecting vertices 502, 504 since vertex 502 represents the portion of circuit design 350 (e.g., and graph 352) including net 2 and vertex 504 represents the portion of circuit design 350 (e.g., and graph 352) including net 3.

Figure 7:
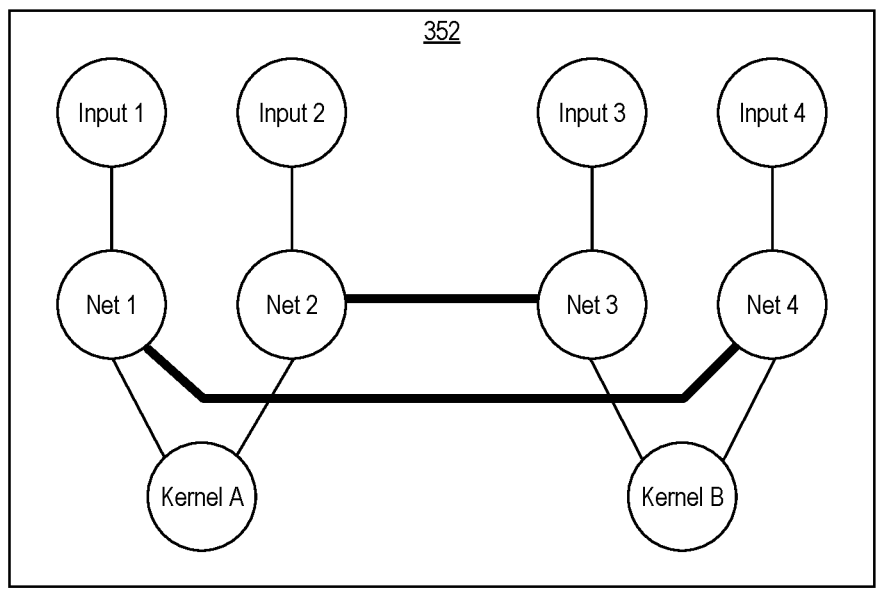
FIG. 7 illustrates another example of the edge creation described in FIG. 3.
Figure 7:
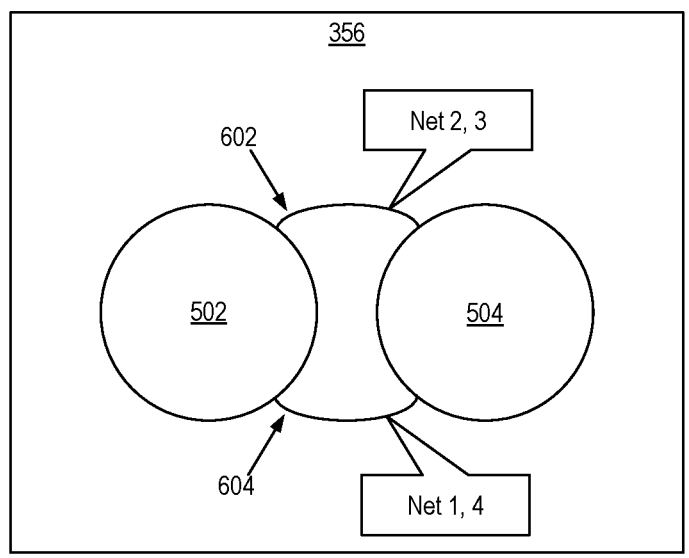

FIG. 7 illustrates another example of the edge creation described in block 314. In the example of FIG. 7, the graph 352 is shown with an edge connecting nets 2 and 3 and an edge connecting nets 1 and 4 only to illustrate that the routing solution generated in block 310 specifies that nets 2 and 3 share one or more routing resources and that nets 1 and 4 share one or more routing resources. In the example, the system has created edges 602, 604 connecting vertices 502, 504 in graph 356. Further, the system has annotated edges 602, 604 with the particular packet-switched nets that share the one or more routing resources. In the example, the system creates edge 602 connecting vertices 502, 504 since vertex 502 represents the portion of circuit design 350 (e.g., and graph 352) including net 2 and vertex 504 represents the portion of circuit design 350 (e.g., and graph 352) including net 3. The system creates the edge 604 connecting vertices 502, 504 since vertex 502 represents the portion of circuit design 350 (e.g., and graph 352) including net 1 and vertex 504 represents the portion of circuit design 350 (e.g., and graph 352) including net 4. As noted, the particular routing resource(s) that are shared by nets 2 and 3 and for nets 1 and 4 may be included in the annotation for edges 602 and 604, respectively.

Continuing with block 316 of FIG. 3, the system performs cycle detection in graph 356. The system is capable of traversing graph 356 to identify any cycles contained therein. The task of identifying cycles is facilitated by the generation of graph 356, which greatly simplifies the representation of circuit design 350. In addition, the generation of graph 356 allows the system to differentiate between cycles that may be included in circuit design 350 intentionally by the creator (e.g., cycles that existed in circuit design 350 prior to the start of method 300) and cycles that were introduced into circuit design 350 by virtue of operation of the router (e.g., by virtue of method 300). Any cycles that may have been included in circuit design 350 by the creator are effectively masked within the vertices of graph 356 by representing connected components as vertices. Only cycles that arise by operation of the router may be detected from graph 356. To prevent deadlock conditions that may exist in the routing solution and be caused by the routing performed, the system performs cycle detection on graph 356 in order to avoid detection and/or removal of cycles that were included in circuit design 350 by the creator.

In block 318, the system determines whether any cycles were detected in graph 356. If no cycles were detected, method 300 may end. In response to detecting one or more cycles in graph 356, method 300 continues to block 320. FIG. 7 illustrates the case where routing has introduced a cycle into circuit design 350. Referring to graph 356 in FIG. 7, the system may traverse from vertex 502 to vertex 504 via edge 602 and traverse back to vertex 502 from vertex 504 via edge 604. By comparison, no cycle is introduced into the circuit design in the example of FIG. 6.

In block 320, the system breaks a cycle by deleting an edge used in the cycle from graph 356 and rips up the routing corresponding to the deleted edge. For example, referring again to FIG. 7, the system is capable of deleting either edge 602 or edge 604. For purposes of illustration, consider the case where the system deletes edge 602. In that case, the system also rips up, e.g., removes or deletes, the portion of the routing solution corresponding to nets 2 and 3. Thus, any routing resources that were used by nets 2 and 3 are now available and no longer shared. In this example, the system is capable of re-routing only those portions that were ripped up. In one or more other examples, the entire routing solution may be ripped and the entire circuit design 350 re-routed.

In block 322, the system is capable of increasing the cost of using the shared routing resources that were freed from ripping up the routing in block 320. In performing routing, a cost metric is typically associated with different routing resources. Those routing resources in higher demand, e.g., needed by more nets, may be given a higher cost. The routing solution performs the mapping of nets to routing resources in a manner that seeks to minimize the total cost of the routing solution. Thus, increasing the cost of the freed routing resources, including those that were shared, will discourage the router from using such routing resources again and may particularly discourage sharing of such routing resource(s).

After block 322, method 300 continues to block 324 to determine whether there are any further cycles that require removal for the current routing solution (or routing iteration). In response to determining that one or more cycles remain in graph 356, method 300 loops back to block 320 to continue processing. Thus, for each cycle detected on graph 356, the system is capable of breaking the cycle by deleting the edge from graph 356 and ripping-up at least the portion of the routing solution corresponding to the deleted edge. In response to determining that no further cycles remain in graph 356, method 300 loops back to block 310 to continue processing where the circuit design 350, or the ripped-up portions of the routing, are re-routed. In block 310, the system re-routes at least the portion of the circuit design 350 for which the portion of the routing solution was ripped up and performs the routing or re-routing as the case may be using the increased cost(s) for the shared routing resource(s) freed from the ripping-up.

The example method illustrated in FIG. 3 permits the sharing of resources for routing packet-switched nets so long as certain conditions are observed so that dedicated circuit-switched paths need not be used. Use of dedicated circuit-switched connections would require more routing resources than the technique illustrated in FIG. 3 and may result in more congestion that prevents the router from converging on a routing solution.

Figure 8:
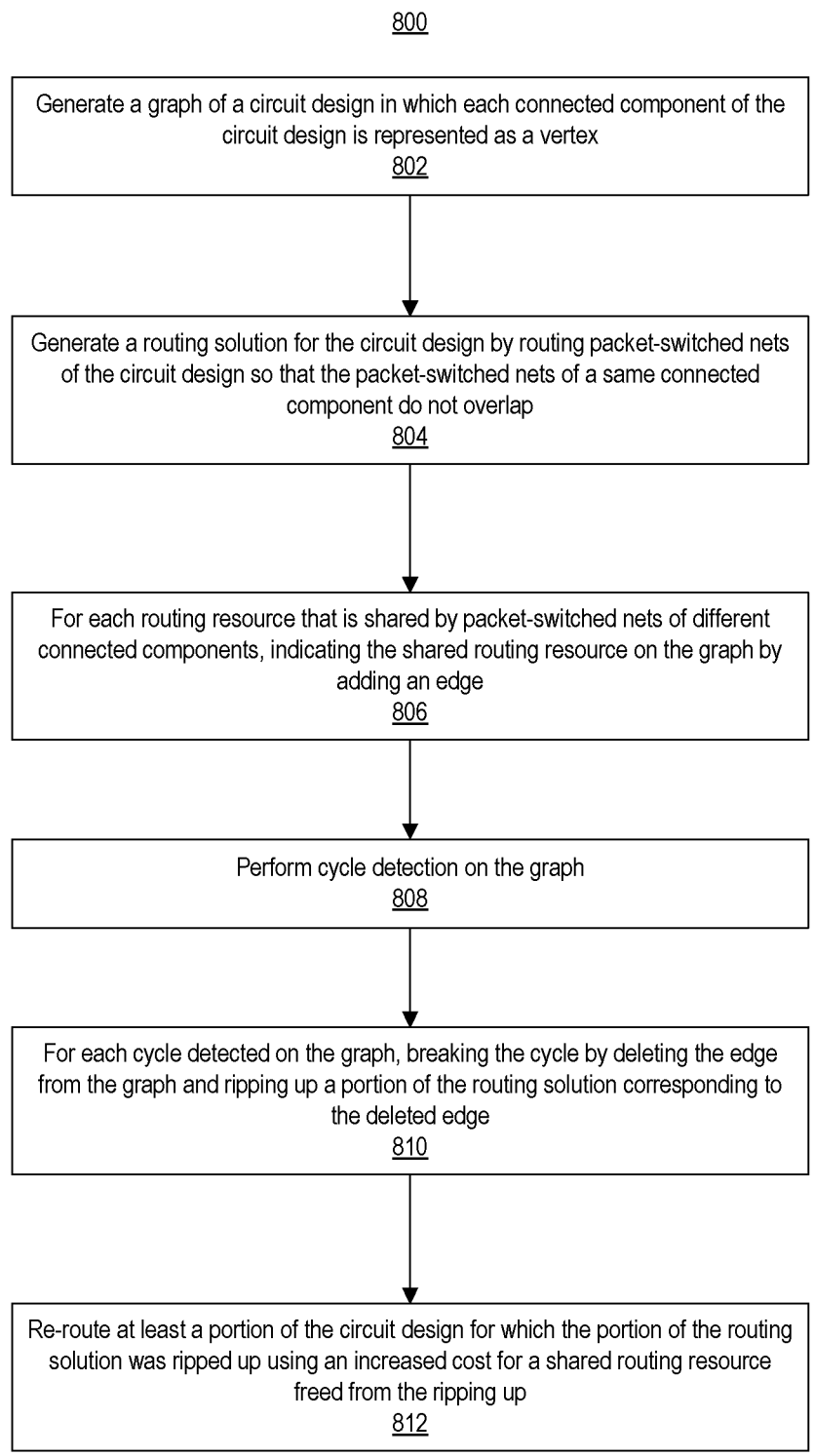
FIG. 8 illustrates another example method of routing a circuit design that includes packet-switched nets.

FIG. 8 illustrates another example method 800 of routing a circuit design that includes packet-switched nets. Method 800 may be performed by a data processing system (e.g., the "system") executing suitable operational program code (e.g., software). An example of a data processing system that may be programmed to perform the operations illustrated in FIG. 8 is described in connection with FIG. 13.

In block 802, the system generates graph 356 of circuit design 350 in which each connected component of circuit design 350 is represented as a vertex. In block 804, the system generates a routing solution for circuit design 350 by routing packet-switched nets of circuit design 350 so that the packet-switched nets of a same connected component do not overlap. In block 806, for each routing resource that is shared by packet switched nets of different connected components, the system indicates the shared routing resource on the graph by adding an edge (e.g., edge 602 or 604). In block 808, the system performs performing cycle detection on graph 356. In block 810, for each cycle detected on graph 356, the system breaks the cycle by deleting an edge of the cycle (e.g., thereby breaking the cycle) from graph 356 and ripping-up a portion of the routing solution corresponding to the deleted edge 602 or 604. In block 812, the system re-routes at least a portion of the circuit design 350 for which the portion of the routing solution was ripped up using an increased cost for a shared routing resource freed from the ripping-up operation.

The inventive arrangements described herein may be used to route any of a variety of ICs that utilize packet-switched nets. In some cases, the packet-switched nets connect various components within a given system on the IC, while in other cases, the packet-switched nets may connect different systems of the IC.

Figure 9:
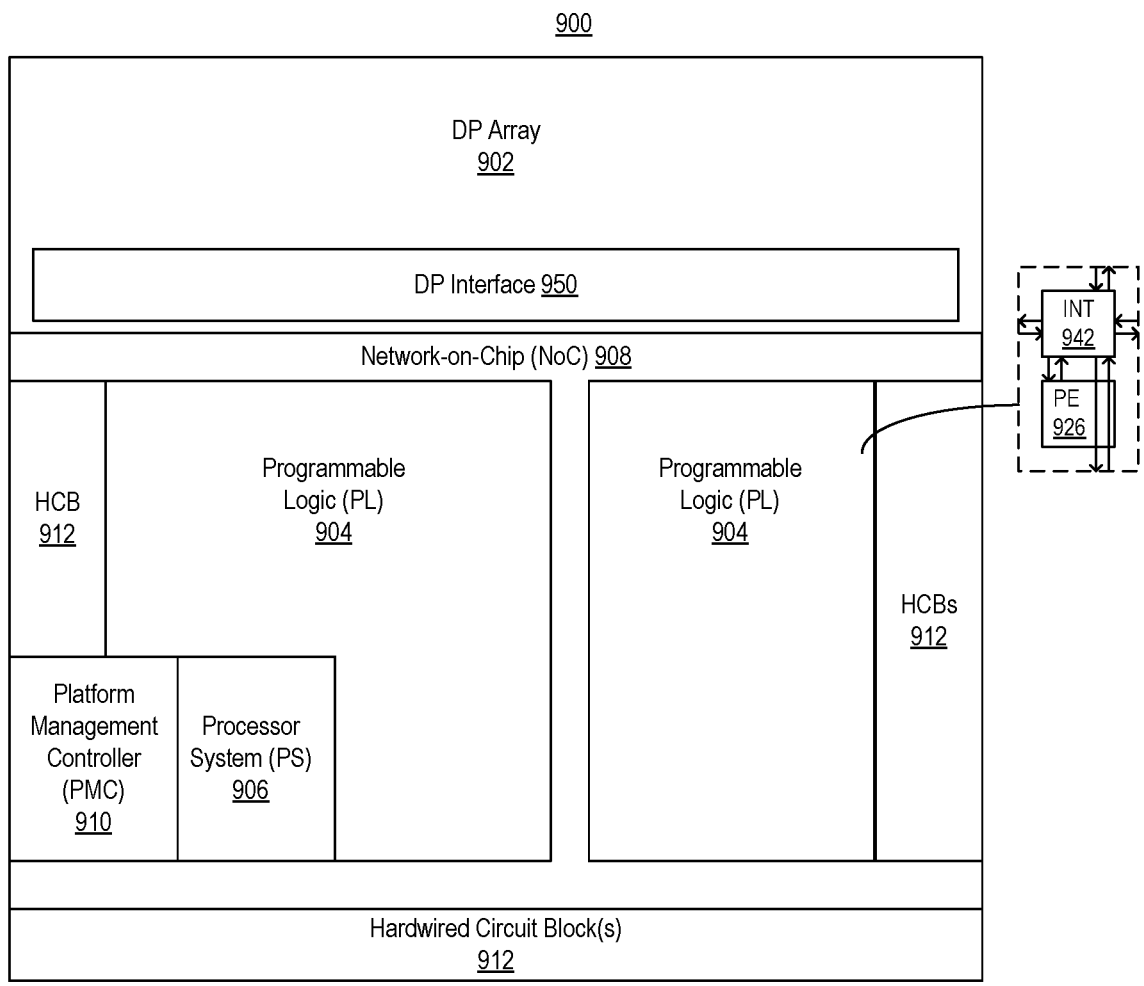
FIG. 9 illustrates an example integrated circuit (IC) having an architecture in which packet-switched nets are used.

FIG. 9 illustrates an example IC having an architecture 900 in which packet-switched nets are used. Architecture 900 may be used to implement a programmable IC, an adaptive system, and/or a System-on-Chip (SoC). In the example of FIG. 9, architecture 900 is implemented on a single die provided within a single package. In other examples, architecture 900 may be implemented using a plurality of interconnected dies within a single package where the various resources of architecture 900 (e.g., circuits) illustrated in FIG. 9 are implemented across the different interconnected dies.

In the example, architecture 900 includes a plurality of different systems including a data processing (DP) array 902, programmable logic (PL) 904, a processor system (PS) 906, a Network-on-Chip (NoC) 908, a platform management controller (PMC) 910, and one or more hardwired circuit blocks 912. An IC for use with the inventive arrangements described herein may include any of a variety of combinations of the systems described herein. For example, an IC may include one or more processors. In another example, the IC may include one or more processors (e.g., PS 906) in combination with PL 904. In another example, the IC may include one or more processors (e.g., PS 906) in combination with a processor array such as DP array 902. In another example, the PMC 910 may be omitted. Such systems may include packet-switched nets and/or be connected by packet-switched nets.

DP array 902 is implemented as a plurality of interconnected and programmable compute tiles and/or memory tiles. Compute and/or memory tiles may be arranged in an array and are hardwired. Each compute tile can include one or more cores, a RAM, and a switch. Each memory tile may include a RAM and a switch. In one example implementation, cores of the compute tiles may be implemented as custom circuits that do not execute program code. In another example implementation, cores of the compute tiles are capable of executing program code stored in core-specific program memories contained within each respective core.

As an example, a core of a compute tile may be implemented as a vector processor capable of performing both fixed and floating-point operations and/or a scalar processor. Each compute tile further includes a RAM and dedicated multi-bit data movement channels connecting the compute tiles. Each compute tile further can include support for direct memory access (DMA) operations and locks to move data to and from other compute tiles.

DP array 902 may include a DP interface 950 that connects compute tiles or memory tiles to other resources of architecture 900. DP interface 950 may include a plurality of interconnected interface tiles organized in a row. In one example, each interface tile may have a same architecture. In another example, interface tiles may be implemented with different architectures where each different interface tile architecture supports communication with different types of resources of architecture 900. Interface tiles of DP interface 950 are connected, e.g., via switches in the respective interface tiles, so that data may be propagated from one interface tile to another bi-directionally. Each interface tile is capable of operating as an interface for the column of compute tiles and/or memory tiles directly above.

Accordingly, each tile of DP array 902 may include a switch, e.g., a stream switch, that is coupled to the switch in each adjacent tile in the up (north), east (right), west (left), and south (down) directions. The switches support packet-based communication among the tiles (e.g., packet-switch nets).

PL 904 is circuitry that may be programmed to perform specified functions. As an example, PL 904 may be implemented as field programmable gate array type of circuitry. PL 904 can include an array of programmable circuit blocks. As defined herein, the term "programmable logic" means circuitry used to build reconfigurable digital circuits. Programmable logic is formed of many programmable circuit blocks that provide basic functionality. The topology of PL 904 is highly configurable unlike hardwired circuitry. In one aspect, each programmable circuit block of PL 904 includes a programmable element 926 (e.g., a functional element) and a programmable interconnect 942. The programmable interconnects 942 provide the highly configurable topology of PL 904. The programmable interconnects 942 may be configured on a per wire basis to provide connectivity among the programmable elements 926 of programmable circuit blocks of PL 904 and is configurable on a per-bit basis (e.g., where each wire conveys a single bit of information) unlike connectivity among the compute tiles and/or memory tiles in data processing array 902, for example.

Examples of programmable circuit blocks of PL 904 include configurable logic blocks having look-up tables (LUTs) and registers. Unlike hardwired circuitry described below and sometimes referred to as hardwired circuit blocks, these programmable circuit blocks have an undefined function at the time of manufacture. PL 904 may include other types of programmable circuit blocks that also provide basic and defined functionality with more limited programmability. Examples of these circuit blocks may include digital signal processing blocks (DSPs), phase lock loops (PLLs), BRAMs, URAMs, and the like. These types of programmable circuit blocks, like others in PL 904, are numerous and intermingled with the other programmable circuit blocks of PL 904. These circuit blocks may also have an architecture that generally includes a programmable interconnect 942 and a programmable element 926 and, as such, are part of the highly configurable topology of PL 904.

Prior to use, PL 904, e.g., the programmable interconnect and the programmable elements, must be programmed or "configured" by loading data referred to as a configuration bitstream into internal configuration memory cells therein. The configuration memory cells, once loaded with a configuration bitstream, define how PL 904 is configured, e.g., the topology, and operates (e.g., particular functions performed).

PS 906 is implemented as hardwired circuitry that is fabricated as part of architecture 900. PS 906 may be implemented as, or include, any of a variety of different processor types each capable of executing program code. For example, PS 906 may be implemented as an individual processor, e.g., a single core capable of executing program code. In another example, PS 906 may be implemented as a multi-core processor. In still another example, PS 906 may include one or more cores, modules, co-processors, I/O interfaces, and/or other resources. PS 906 may be implemented using any of a variety of different types of architectures. Example architectures that may be used to implement PS 906 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code.

NoC 908 is a programmable interconnecting network for sharing data between endpoint circuits in architecture 900. The endpoint circuits can be disposed in DP array 902, PL 904, PS 906, and/or selected hardwired circuit blocks 912. NoC 908 can include high-speed data paths with dedicated switching. In an example, NoC 908 includes one or more horizontal paths, one or more vertical paths, or both horizontal and vertical path(s). The arrangement and number of regions shown in FIG. 9 is merely an example. NoC 908 is an example of the common infrastructure that is available within architecture 900 to connect selected components and/or systems.

Nets, e.g., packet-switched nets, that are to be routed through NoC 908 may be unknown until a design is created for implementation within architecture 900. NoC 908 may be programmed by loading configuration data into internal configuration registers that define how elements within NoC 908 such as switches and interfaces are configured and operate to pass data from switch to switch and among the NoC interfaces to connect the endpoint circuits. NoC 908 is fabricated as part of architecture 900 (e.g., is hardwired) and, while not physically modifiable, may be programmed to establish logical connectivity between different master circuits and different slave circuits of a user circuit design. NoC 908, upon power-on, does not implement any data paths or routes therein. Once configured by a master circuit such as PMC 910, however, NoC 908 implements data paths or routes between endpoint circuits.

PMC 910 is responsible for managing architecture 900. PMC 910 is a system within architecture 900 that is capable of managing the other programmable circuit resources across the entirety of architecture 900. PMC 910 is capable of maintaining a safe and secure environment, booting architecture 900, and managing architecture 900 during normal operations. For example, PMC 910 is capable of providing unified and programmable control over power-up, boot/configuration, security, power management, safety monitoring, debugging, and/or error handling for the different systems of architecture 900 (e.g., DP array 902, PL 904, PS 906, and NoC 908). PMC 910 operates as a dedicated platform manager that decouples PS 906 and from PL 904. As such, PS 906 and PL 904 may be managed, configured, and/or powered on and/or off independently of one another.

Hardwired circuit blocks 912 are special-purpose circuit blocks fabricated as part of architecture 900. Though hardwired, hardwired circuit blocks 912 may be configured by loading configuration data into control registers to implement one or more different modes of operation. Examples of hardwired circuit blocks 912 may include input/output (I/O) blocks, transceivers for sending and receiving signals to circuits and/or systems external to architecture 900, memory controllers, or the like. Examples of different I/O blocks may include single-ended and pseudo differential I/Os. Examples of transceivers may include high-speed differentially clocked transceivers. Other examples of hardwired circuit blocks 912 include, but are not limited to, cryptographic engines, digital-to-analog converters (DACs), analog-to-digital converters (ADCs), and the like. In general, hardwired circuit blocks 912 are application-specific circuit blocks.

The various programmable circuit resources illustrated in FIG. 9 may be programmed initially as part of a boot process for architecture 900. During runtime, the programmable circuit resources may be reconfigured. In one aspect, PMC 910 is capable of initially configuring DPE array 902, PL 904, PS 906, and NoC 908. At any point during runtime, PMC 910 may reconfigure all or a portion of architecture 900. In some cases, PS 906 may configure and/or reconfigure PL 904 and/or NoC 908 once initially configured by PMC 910 or in cases where PMC 910 is omitted.

Architecture 900 is provided as an example. Other example architectures for an IC in which one or more PNL activation engines 100 may be implemented may include only PL 904, only DP array 902, only HCBs 912, or any combination of the foregoing systems.

Figure 10:
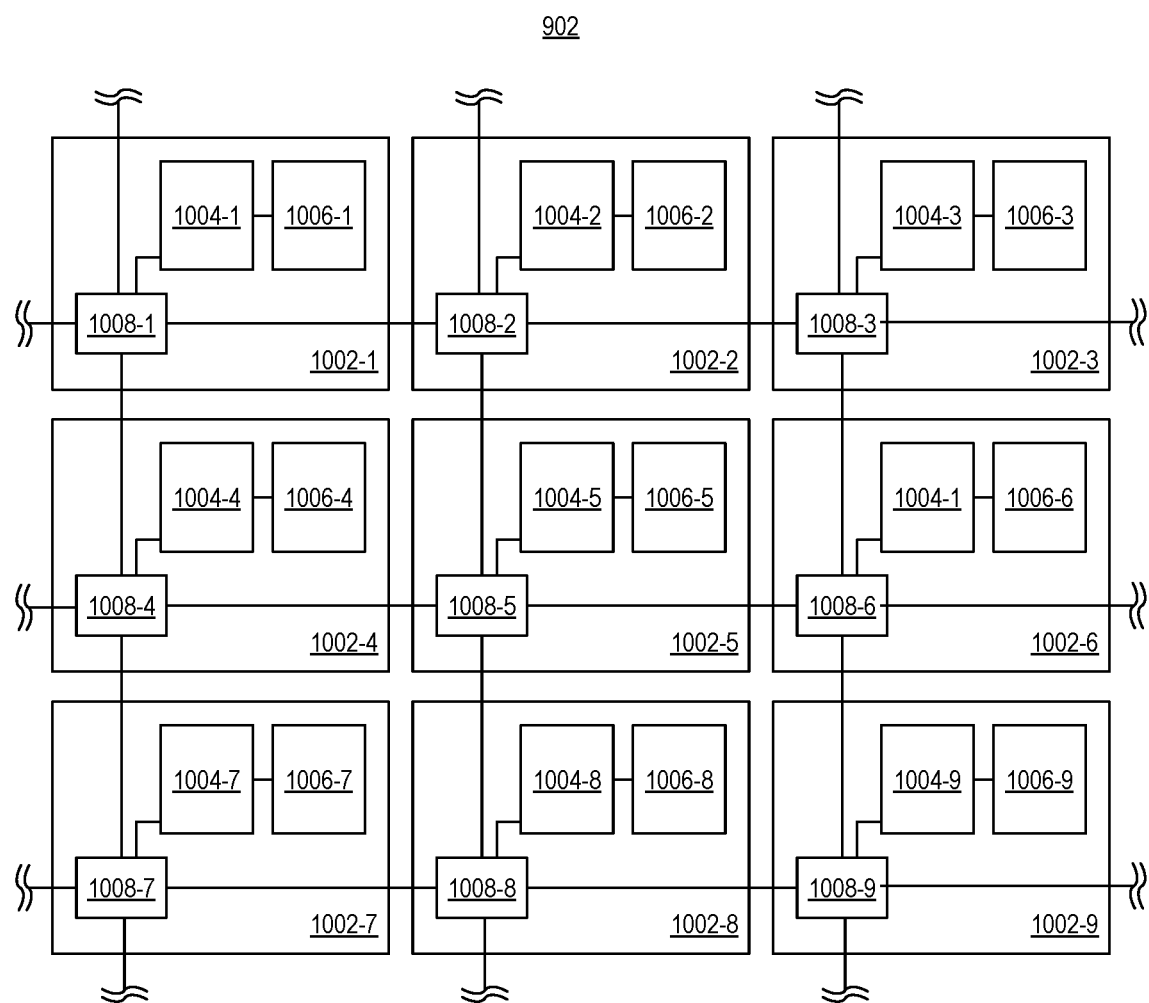
FIG. 10 illustrates an example of a system of an IC in which packet-switched nets are used.

FIG. 10 illustrates an example of a system of an IC in which packet-switched nets are used. More particularly, FIG. 10 illustrates an example portion of DP array 902. In the example, DP array 902 includes a plurality of compute tiles 1002. For purposes of illustration, the example of FIG. 10 includes only compute tiles. As noted, DP array 902 also may include memory tiles.

Each compute tile may include a core 1004, a RAM 1006, and a switch 1008 (e.g., a stream switch). As shown, the switches 1008 are coupled together to facilitate packet-based communication among the compute tiles, e.g., between cores 1004, RAMs 1006, and/or cores 1004 and RAMs 1006. Each of the tiles may be a compute tile or a memory tile. The inventive arrangements may be used to generate a deadlock-free routing for a DP array 902 as illustrated in the example of FIGS. 9 and 10 or others similar thereto.

Figure 11:
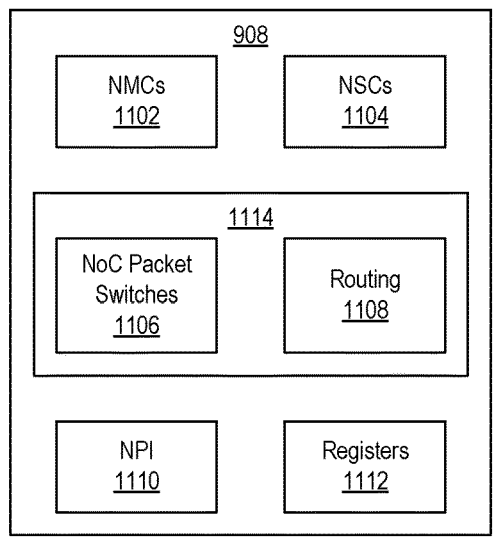
FIG. 11 illustrates another example of a system of an IC in which packet-switched nets are used.

FIG. 11 illustrates another example of a system of an IC in which packet-switched nets are used. More particularly, FIG. 11 illustrates an example implementation of NoC 908. NoC 908 includes NoC master circuits (NMCs) 1102, NoC slave units (NSCs) 1104, a network 1114, a NoC peripheral interconnect (NPI) 1110, and registers 1112. Each NMC 1102 is an ingress circuit that connects an endpoint circuit to NoC 908. Each NSC 1104 is an egress circuit that connects NoC 908 to an endpoint circuit. NMCs 1102 are connected to NSCs 1104 through network 1114. In an example, network 1114 includes NoC packet switches 1106 and routing 1108 between NoC packet switches 1110. Each NoC packet switch 1110 performs switching of NoC packets. NoC packet switches 1106 are connected to each other and to NMCs 1102 and NSCs 1104 through routing 1108 to implement a plurality of physical channels. NoC packet switches 1106 also support multiple virtual channels per physical channel.

In general, NPI 1110 includes circuitry to program NMCs 1102, NSCs 1104, and NoC packet switches 1106. For example, NMCs 1102, NSCs 1104, and NoC packet switches 1106 can include registers 1112 that determine functionality thereof. NPI 1110 includes a peripheral interconnect coupled to registers 1112 for programming thereof to set functionality. Registers 1112 in NoC 908 support interrupts, Quality of Service (QoS), error handling and reporting, transaction control, power management, and address mapping control. Registers 1112 can be initialized in a usable state before being reprogrammed, such as by writing to registers 1112 using write requests. Configuration data for NoC 908 can be stored in a non-volatile memory (NVM), e.g., as part of a programming device image (PDI), and provided to NPI 1110 for programming NoC 908 and/or other endpoint circuits.

NMCs 1102 are traffic ingress points. NSCs 1104 are traffic egress points. Endpoint circuits coupled to NMCs 1102 and NSCs 1104 can be hardened circuits (e.g., hardwired circuit blocks 912), circuits implemented in PL 904, circuits of PS 906, and/or tiles in DP array 902. A given endpoint circuit can be coupled to more than one NMC 1102 or more than one NSC 1104.

Figure 12:
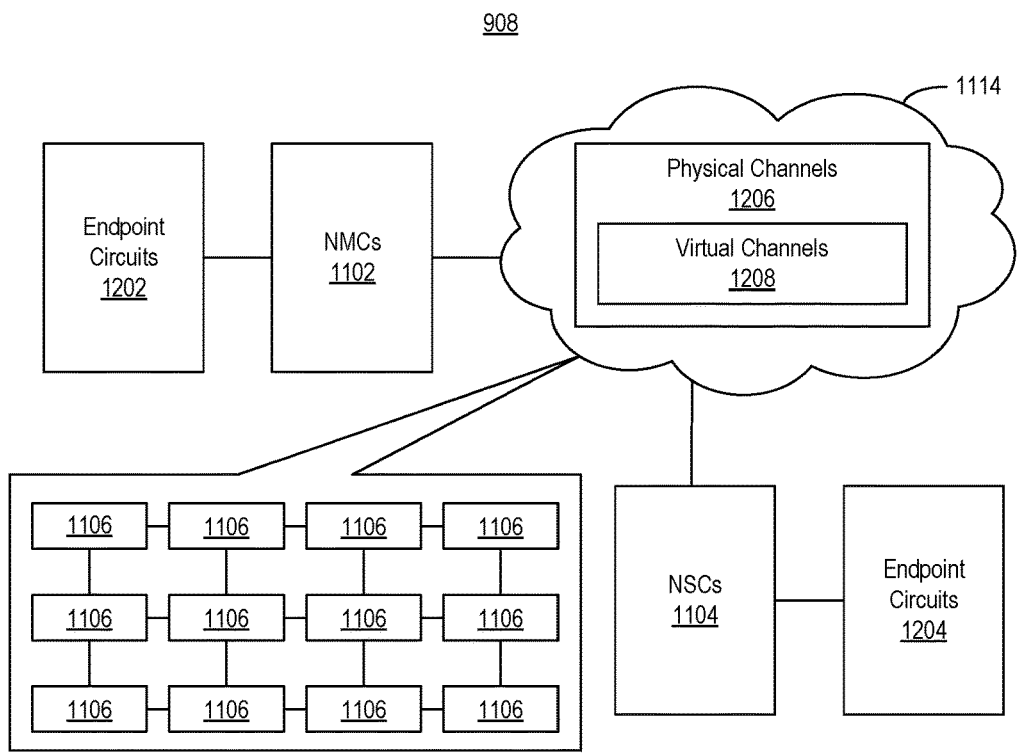
FIG. 12 is a block diagram depicting connections between endpoint circuits in an IC through a Network-on-Chip according to an example.

FIG. 12 is a block diagram depicting connections between endpoint circuits in an IC through NoC 908 according to an example. In the example, endpoint circuits 1202 are connected to endpoint circuits 1204 through NoC 908. Endpoint circuits 1202 are master circuits, which are coupled to NMCs 1102 of NoC 908. Endpoint circuits 1204 are slave circuits coupled to NSCs 1104 of NoC 908. Each endpoint circuit 1202 and 1204 can be a circuit in the PS 906, a circuit in a region of PL 904, or a circuit in another system (e.g., hardwired circuit blocks 912 or a tile of DP array 902).

Network 1114 includes a plurality of physical channels 1206. Physical channels 1206 are implemented by programming NoC 908. Each physical channel 1206 includes one or more NoC packet switches 1106 and associated routing 1108 through which packet-switched data may be conveyed. An NMC 1102 connects with an NSC 1104 through at least one physical channel 1206. A physical channel 1206 can also have one or more virtual channels 1208.

Connections through network 1114 use a master-slave arrangement. In an example, the most basic connection over network 1114 includes a single master connected to a single slave. However, in other examples, more complex structures can be implemented.

Figure 13:
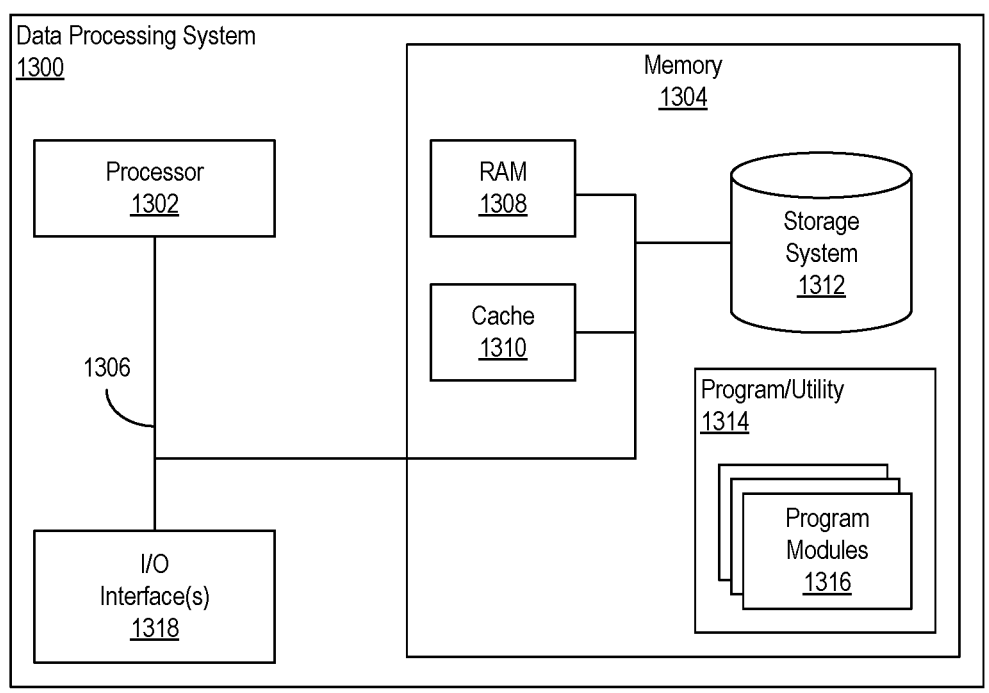
FIG. 13 illustrates an example of a data processing system that is capable of performing the various operations described within this disclosure.

FIG. 13 illustrates an example of a data processing system 1300 that is capable of performing the various operations described within this disclosure. As defined herein, "data processing system" means one or more hardware systems configured to process data, each hardware system including at least one processor programmed to initiate operations and memory.

The components of data processing system 1300 can include, but are not limited to, a processor 1302, a memory 1304, and a bus 1306 that couples various system components including memory 1304 to processor 1302. Processor 1302 may be implemented as one or more processors. In an example, processor 1302 is implemented as a central processing unit (CPU). As defined herein, the term "processor"

means at least one circuit capable of carrying out instructions contained in program code. The circuit may be an integrated circuit or embedded in an integrated circuit. Processor 1302 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1306 represents one or more of any of a variety of communication bus structures. By way of example, and not limitation, bus 1306 may be implemented as a Peripheral Component Interconnect Express (PCIe) bus. Data processing system 1300 typically includes a variety of computer system readable media. Such media may include computer-readable volatile and non-volatile media and computer-readable removable and non-removable media.

Memory 1304 can include computer-readable media in the form of volatile memory, such as random-access memory (RAM) 1308 and/or cache memory 1310. Data processing system 1300 also can include other removable/non-removable, volatile/non-volatile computer storage media. By way of example, storage system 1312 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1306 by one or more data media interfaces. Memory 1304 is an example of at least one computer program product.

Program/utility 1314, having a set (at least one) of program modules 1316, may be stored in memory 1304. Program/utility 1314 is executable by processor 1302. By way of example, program modules 1316 may represent an operating system, one or more application programs, other program modules, and program data. Program modules 1316, upon execution, cause data processing system 1300, e.g., processor 1302, to carry out the functions and/or methodologies of the example implementations described within this disclosure. Program/utility 1314 and any data items used, generated, and/or operated upon by data processing system 1300 are functional data structures that impart functionality when employed by data processing system 1300. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor. Examples of data structures include, but are not limited to, the various graphs described herein, routing constraints, and circuit designs.

For example, one or more program modules 1316 may implement an EDA application that is capable of performing the operations described herein. Further, the EDA application may perform other operations relating to a design flow such as synthesis, placement, and/or generation of configuration data such as a bitstream that may be loaded into an IC to physically realize the processed circuit design therein.

Data processing system 1300 may include one or more Input/Output (I/O) interfaces 1318 communicatively linked to bus 1306. I/O interface(s) 1318 allow data processing system 1300 to communicate with one or more external devices and/or communicate over one or more networks such as a local area network (LAN), a wide area network (WAN), and/or a public network (e.g., the Internet). Examples of I/O interfaces 1318 may include, but are not limited to, network cards, modems, network adapters, hardware controllers, etc. Examples of external devices also may include devices that allow a user to interact with data processing system 1300 (e.g., a display, a keyboard, and/or a pointing device) and/or other devices such as accelerator card.

Data processing system 1300 is only one example implementation. Data processing system 1300 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 13 is not intended to suggest any limitation as to the scope of use or functionality of example implementations described herein. Data processing system 1300 is an example of computer hardware that is capable of performing the various operations described within this disclosure. In this regard, data processing system 1300 may include fewer components than shown or additional components not illustrated in FIG. 13 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 1300 may be operational with numerous other general-purpose or special-purpose computing system environments or configurations. Examples of computing systems, environments, and/or configurations that may be suitable for use with data processing system 1300 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 1300 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program code for use by or in connection with an instruction execution system, apparatus, or device. As defined herein, a "computer-readable storage medium" is not a transitory, propagating signal per se. A computer-readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer-readable storage media. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "computer-readable program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
   generating a graph of a circuit design in which each connected component of the circuit design is represented as a vertex;
   generating a routing solution for the circuit design by routing packet-switched nets of the circuit design so that the packet-switched nets of a same connected component do not overlap;
   for each routing resource that is shared by packet-switched nets of different connected components, indicating the shared routing resource on the graph by adding an edge;
   performing cycle detection on the graph;
   for each cycle detected on the graph, breaking the cycle by deleting the edge from the graph and ripping-up at least a portion of the routing solution corresponding to the deleted edge; and
   re-routing at least a portion of the circuit design for which the at least a portion of the routing solution was ripped up using an increased cost for a shared routing resource freed from the ripping-up.

2. The method of claim 1, further comprising:
   increasing the cost of the shared routing resource.

3. The method of claim 1, wherein the generating the graph of the circuit design comprises:
   generating an initial graph representing the circuit design, wherein the initial graph is specified as an undirected graph that represents packet-switched nets of the circuit design as vertices; and
   detecting the connected components in the initial graph.

4. The method of claim 1, further comprising:
   generating one or more routing constraints specifying that the packet-switched nets of a same connected component do not overlap.

5. The method of claim 1, wherein the generating the routing solution further comprises:
   permitting overlap of packet-switched nets belonging to different connected components.

6. The method of claim 1, wherein the added edge connects a pair of the connected components each having a packet-switched net that shares the shared routing resource.

7. The method of claim 6, further comprising:
   annotating the added edge to specify the packet-switched net from each connected component that shares the shared routing resource.

8. A system, comprising:
   a processor configured to initiate operations including:
   generating a graph of a circuit design in which each connected component of the circuit design is represented as a vertex;
   generating a routing solution for the circuit design by routing packet-switched nets of the circuit design so that the packet-switched nets of a same connected component do not overlap;
   for each routing resource that is shared by packet-switched nets of different connected components, indicating the shared routing resource on the graph by adding an edge;
   performing cycle detection on the graph;
   for each cycle detected on the graph, breaking the cycle by deleting the edge from the graph and ripping-up at least a portion of the routing solution corresponding to the deleted edge; and
   re-routing at least a portion of the circuit design for which the at least a portion of the routing solution was ripped up using an increased cost for a shared routing resource freed from the ripping-up.

9. The system of claim 8, wherein the processor is programmed to initiate operations further comprising:
increasing the cost of the shared routing resource.

10. The system of claim 8, wherein the generating the graph of the circuit design comprises:
generating an initial graph representing the circuit design, wherein the initial graph is specified as an undirected graph that represents packet-switched nets of the circuit design as vertices; and
detecting the connected components in the initial graph.

11. The system of claim 8, wherein the processor is programmed to initiate operations further comprising:
generating one or more routing constraints specifying that the packet-switched nets of a same connected component do not overlap.

12. The system of claim 8, wherein the generating the routing solution further comprises:
permitting overlap of packet-switched nets belonging to different connected components.

13. The system of claim 8, wherein the added edge connects a pair of the connected components each having a packet-switched net that shares the shared routing resource.

14. The system of claim 13, wherein the processor is programmed to initiate operations further comprising:
annotating the added edge to specify the packet-switched net from each connected component that shares the shared routing resource.

15. A computer program product, comprising:
one or more computer-readable storage media, and program instructions collectively stored on the one or more computer-readable storage media, wherein the program instructions are executable by computer hardware to initiate operations including:
generating a graph of a circuit design in which each connected component of the circuit design is represented as a vertex;
generating a routing solution for the circuit design by routing packet-switched nets of the circuit design so that the packet-switched nets of a same connected component do not overlap;
for each routing resource that is shared by packet-switched nets of different connected components, indicating the shared routing resource on the graph by adding an edge;
performing cycle detection on the graph;
for each cycle detected on the graph, breaking the cycle by deleting the edge from the graph and ripping-up at least a portion of the routing solution corresponding to the deleted edge; and
re-routing at least a portion of the circuit design for which the at least a portion of the routing solution was ripped up using an increased cost for a shared routing resource freed from the ripping-up.

16. The computer program product of claim 15, wherein the program instructions are executable by the computer hardware to initiate operations further comprising:
increasing the cost of the shared routing resource.

17. The computer program product of claim 15, wherein the generating the graph of the circuit design comprises:
generating an initial graph representing the circuit design, wherein the initial graph is specified as an undirected graph that represents packet-switched nets of the circuit design as vertices; and
detecting the connected components in the initial graph.

18. The computer program product of claim 15, wherein the program instructions are executable by the computer hardware to initiate operations further comprising:
generating one or more routing constraints specifying that the packet-switched nets of a same connected component do not overlap.

19. The computer program product of claim 15, wherein the generating the routing solution further comprises:
permitting overlap of packet-switched nets belonging to different connected components.

20. The computer program product of claim 15, wherein the added edge connects a pair of the connected components each having a packet-switched net that shares the shared routing resource.

\* \* \* \* \*